United States Patent [19]

Williams et al.

[11] Patent Number: 4,973,629

[45] Date of Patent: *Nov. 27, 1990

[54] COMPOSITIONS OF AROMATIC POLYBENZIMIDAZOLES AND AROMATIC POLYIMIDES

[75] Inventors: David J. Williams, Amherst, Mass.; Louis Leung, Hong Kong, Hong Kong; Frank E. Karasz; William J. MacKnight, both of Amherst, Mass.; Michael Jaffe, Maplewood, N.J.

[73] Assignee: Hoechst Celanese Corp., Somerville, N.J.

[*] Notice: The portion of the term of this patent subsequent to Nov. 27, 2007 has been disclaimed.

[21] Appl. No.: 831,389

[22] Filed: Feb. 19, 1986

[51] Int. Cl.$^5$ .................... C08L 79/06; C08L 79/08
[52] U.S. Cl. ................... 525/432; 525/435; 525/931
[58] Field of Search .............. 525/432, 435, 931

[56] References Cited

FOREIGN PATENT DOCUMENTS 1226711 3/1971 United Kingdom .
1237004 6/1971 United Kingdom .

OTHER PUBLICATIONS

*Report* 1985, Univ. Mass., Dept. Poly. Sci. Eng., Order No. AD-A166150/3/GAR–"Improved Structural Polymer Alloys and Composites", 1985.
Plast. Massy 1973 (4) 15–17, Chudina et al., "Polyimides and Poly(Benzimidazoles) for Glass–Fiber Reinforced Plastics and Adhesives", (English translation attached).

*Primary Examiner*—Ana L. Carrillo
*Attorney, Agent, or Firm*—Kenneth E. Macklin

[57] ABSTRACT

Miscible compositions comprising from about 1 part by weight to about 99 parts by weight of an aromatic polyimide and from about 99 parts by weight to about 1 part by weight of an aromatic polybenzimidazole. Preferably, the composition comprises from about 5 parts by weight to about 95 parts by weight of an aromatic polyimide and from about 95 parts by weight to about 5 parts by weight of an aromatic polybenzimidazole. In a composition mostly comprised of an aromatic polybenzimidazole, it is preferred that the aromatic polyimide be thermoplastic and be present in the composition in an amount sufficient to make the aromatic polybenzimidazole more processable for molding purposes and also less susceptible to moisture. More preferably, such compositions are comprised of from about 65 parts by weight to about 95 parts by weight of an aromatic polybenzimidazole and from about 35 parts by weight to about 5 parts by weight of a thermoplastic aromatic polyimide. In a composition mostly comprised of a soluble, thermoplastic aromatic polyimide, it is preferred that the aromatic polybenzimidazole be present in an amount sufficient to render the soluble thermoplastic aromatic polyimide less sensitive to solvents, and to increase its glass transition temperature. More preferably, such compositions are comprised of from about 6 parts by weight to about 95 parts by weight of a soluble thermoplastic aromatic polyimide and from about 35 parts by weight to about 5 parts by weight of an aromatic polybenzimidazole.

29 Claims, 4 Drawing Sheets

COMPOSITIONS OF AROMATIC POLYBENZIMIDAZOLES AND AROMATIC POLYIMIDES

This invention is concerned with novel compositions comprising an aromatic polyimide and an aromatic polybenzimidazole. The novel compositions are suitable for the formation of films, coatings, molding compositions, and the like.

This invention was made with Government support under Contract No. F49620-84-C-0051 awarded by the Department of Defense (DOD). The Government has certain rights in this invention.

BACKGROUND OF THE INVENTION

The number of known classes of high performance polymers which are useful under severe environmental conditions is limited. In addition, some of the known classes of polymers are deficient in some properties, e.g., impact resistance, solvent resistance, and processability.

PRIOR ART

The aromatic polyimides (PI) are a series of high-performance polymers. Generally they have high heat resistance, high strength-to-weight ratio, high modulus, excellent flammability characteristics, low smoke evolution, high dielectric strength, and stable dielectric constants and dissipation factors over a wide range of temperatures and frequencies.

Aromatic polybenzimidazoles (PBI) are characterized by a high degree of thermal stability. They may be shaped to form films and other articles of wide utility which show resistance to degradation by heat, hydrolytic media and oxidizing media. However, many of the polybenzimidazoles are not sufficiently thermoplastic at desirably low temperatures and pressures for molding.

Aromatic polybenzimidazole available from Celanese Corporation has the following repeating unit formula:

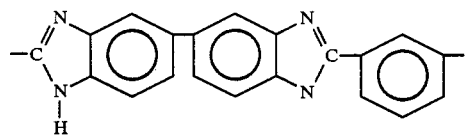

It too has high heat and chemical resistance, and dielectric strength. Unfortunately, the aromatic polybenzimidazoles have relatively high moisture again, which although desirable for textile fibers, is undesirable for engineering plastics.

A review of the processes for the preparation of aromatic linear condensation polyimides is contained in J. P. Critchley, G. J. Knight and W. W. Wright, *Heat-Resistant Polymers - Technologically Useful Materials*, Plenum Press, New York (1983), 186–211.

Processes for the preparation of aromatic polybenzimidazoles are described in a number of U.S. Patents, e.g., 3,901,855; 4,002,679; 3,433,772; 3,441,640, 3,509,108., 3,526,693; 3,549,603., 3,552,389; 3,619,453; 3,671,491, 3,969,430., and 4,020,142. In addition, a review of the processes for the preparation of aromatic polybenzimidazoles is contained in J. P. Critchley, G. J. Knight and W.W. Wright, *Heat-Resistant Polymers - Technologically Useful Materials*, Plenum Press, New York (1983), 259–268. This reference makes the point that despite considerable research effort, polybenzimidazoles have not been commercially successful except as fibers and fabrics. On page 259, it states that polybenzimidazoles "have not been very substantial competitors" to the polyimides.

It is generally known that most pairs of polymers tend to be totally immiscible [Fred W. Billmeyer, Jr., *Textbook of Polymer Science*, Wiley-Interscience, 176 (1984)]. It is also known that even many polyimides are not miscible with each other. It is therefore surprising that the compositions of the present invention are miscible and also surprising that there are synergistic ameliorative effects of one polymer on the other's weak properties, as detailed below.

U.S.S.R. Inventor's Certificate SU 1016321 A, entitled "Procedure for the production of Film Materials Based on Aromatic Polybenzimidazole" describes dissolving a polybenzimidazole in N,N-dimethylformamide and then dissolving a poly-bis-maleimide in the solution, and pouring the solution onto a glass plate. After 3-4 hours the film is removed from the plate and heated at 180° C. The poly-bis-maleimide is an oligomer of rather low molecular weight, which is addition polymerized to produce a crosslinked structure of essentially infinite molecular weight after it is blended with the polybenzimidazole. In contrast, the aromatic polyimides used in the compositions of the present invention are high molecular weight, linear, condensation polymers. Furthermore, the imide ring in the bis-maleimide is linked to an aliphatic group; whereas in the aromatic polyimides used in the present invention, the imide ring forms a fused ring structure with an aromatic moiety. The composition of the U.S.S.R. Inventor's Certificate is apparently crosslinked to form a thermoset resin, whereas the compositions of the present invention remain essentially linear in structure throughout their processing cycle.

Japanese Patent Publication No. 17468 (1973), entitled "Polybenzimidazole Molding Material," describes mixing a polybenzimidazole and a nylon, e.g., nylon 6 or nylon 66, in a solvent such as N,N-dimethylformamide or N,N-dimethylacetamide, kneading the mixture, dropping the kneaded mixture into water, and then heating the mixture at 200° C. under vacuum to remove water and N,N-dimethylacetamide. The resulting material was ground to obtain molding material of 15 mesh particle size. It is apparent from the reference that a miscible blend is not formed but rather a non-miscible dough-like mass, which must be kneaded to effect the physical admixture.

SUMMARY OF THE INVENTION

Despite the fact that most pairs of polymers tend to be immiscible, we have discovered unexpectedly that certain aromatic polyimides and certain aromatic polybenzimidazoles are miscible in all proportions.

Briefly, the invention comprises novel compositions comprising from about 1 part by weight to about 99 parts by weight of an aromatic polyimide and from about 99 parts by weight to about 1 part by weight of an aromatic polybenzimidazole. Preferably, the composition comprises from about 5 parts by weight to about 95 parts by weight of an aromatic polyimide and from about 95 parts by weight to about 5 parts by weight of an aromatic polybenzimidazole. Most preferably, the composition comprises at least about 10 to 30 parts by weight of an aromatic polybenzimidazole or a soluble thermoplastic aromatic polyimide.

Generally, to prepare miscible compositions of the invention from soluble thermoplastic aromatic polyimides and an aromatic polybenzimidazole, at different weight compositions, the aromatic polybenzimidazole and a soluble thermoplastic aromatic polyimide may be first dissolved in a mutual solvent, e.g., N,N-dimethylformamide, N,N-dimethylacetamide or N-methylpyrrolidone, so that each polymer is present in the resulting solution at the desired concentrations of from about 1% to about 30% each on a weight/volume basis, preferably from about 1% to 15% each. Then the solution may be added to a non-solvent for the composition, e.g., methanol, to precipitate a novel composition of this invention in the desired concentration. Subsequently, the precipitated composition is washed with, e.g., methanol or water, to remove residual solvent and then, e.g., vacuum-dried at moderate temperatures. Alternatively, films of the solution of the composition can be cast and the solvent evaporated. Trace amounts of solvent may be removed by washing the film with hot water.

The polyamic acid process for preparing miscible compositions broadly comprises dissolving an aromatic polybenzimidazole and an aromatic polyimide in its precursor polyamic acid form in a mutual solvent in relative weight proportions to each other of from about 1 to about 99 of the aromatic polybenzimidazole to about 99 to about 1 of the polyamic acid, casting a film, removing the solvent and then cyclizing to form the polyimide.

The novel compositions of this invention have unexpected properties and benefits. The compositions are useful under severe environmental conditions. The compositions have good impact resistance, solvent resistance, and good performance characteristics.

Although aromatic polybenzimidazoles generally have high glass transition temperatures and good solvent resistance, they are moisture sensitive. Soluble, thermoplastic aromatic polyimides generally have lower glass transition temperatures and lack resistance to certain solvents.

Therefore, it is an object of this invention to provide compositions of aromatic polybenzimidazoles and soluble thermoplastic aromatic polyimides, which have higher glass transition temperatures and better solvent resistance than the soluble thermoplastic polyimides.

It is a further object of this invention to provide compositions of aromatic polybenzimidazoles and aromatic polyimide blends which are useful in molding processes and in applications where the polybenzimidazoles themselves were either not useful or not as useful.

DESCRIPTION OF THE PREFERRED EMBODIMENTS

Figure 1:
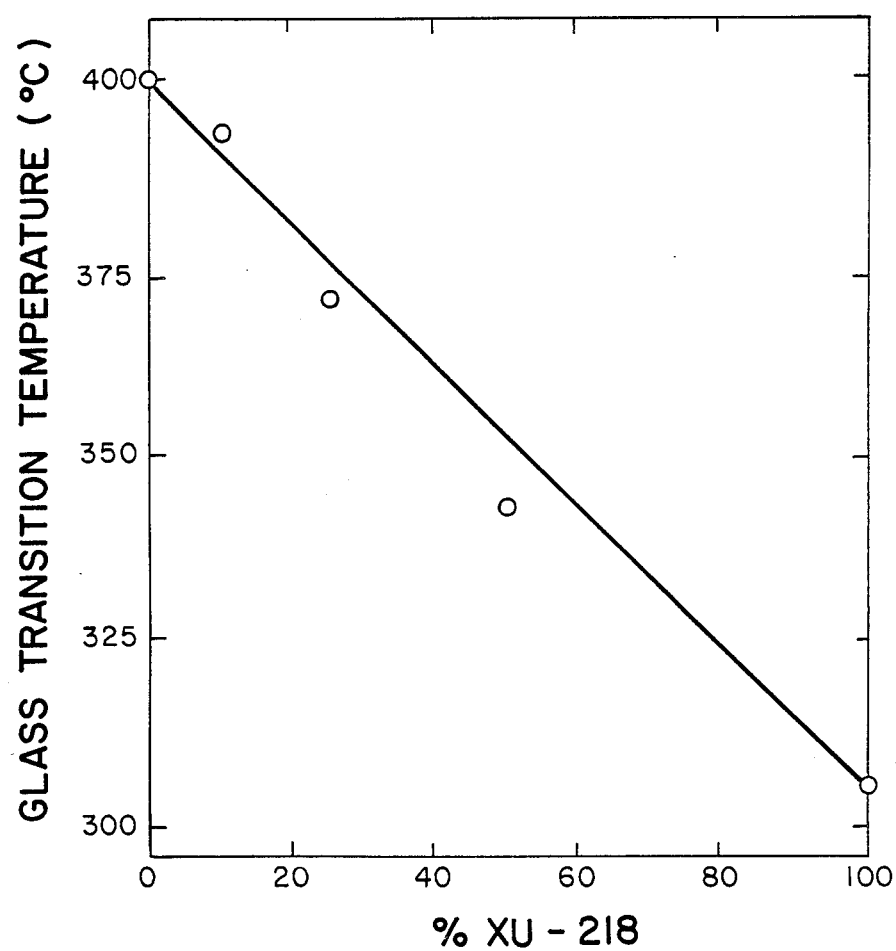
FIG. 1 shows the single intermediate glass transitions, indicating miscibility, determined from differential scanning calorimetry scans for Celanese polybenzimidazole-Ciba-Geigy XU-218 aromatic polyimide compositions ranging from 10% to 50% of XU-218 polyimide.

Aromatic polyimides which may be used in the compositions and processes of this invention have repeating units of the following formula

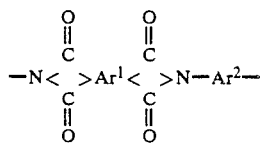

wherein a>Ar$^1$<represents a tetravalent aromatic moiety having the structure:

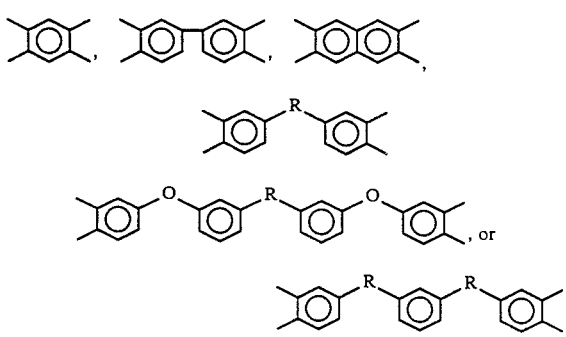

and wherein —Ar$^2$— represents a divalent aromatic moiety having the structure:

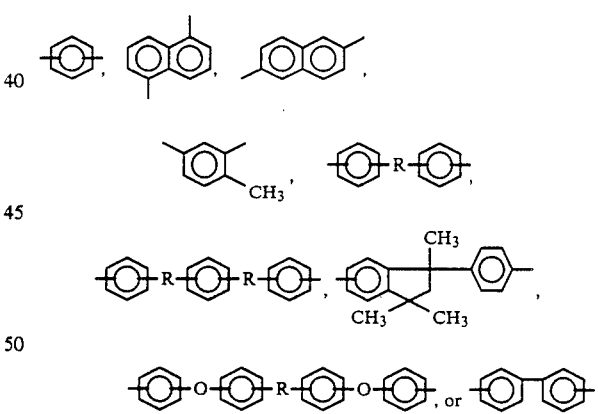

wherein R is —O—, —S—, ⫶CH2⫶, ⫶CF2⫶, ⫶SiOR$^1$⫶,

>C=O, >SO$_2$, >C(CH$_3$)$_2$, >C(CF$_3$)$_2$, >C(CF$_3$)(C$_6$H$_5$), or mixtures thereof, and wherein R$^1$ is —CH$_3$, —C$_6$H$_5$, —C$_6$H$_4$—CH$_3$ or a mixture thereof, x having a value of from 1 to about 6. Aromatic polyimides vary widely in their solubility and thermoplasticity. They may be classified into three types:
 (a) soluble and thermoplastic,
 (b) thermoplastic but non-soluble, and
 (c) non-thermoplastic and non-soluble.

The aromatic polyimides of type (a) generally have lower glass transitions than type (c1, and they are available and tractable in their fully imidized form. The soluble, thermoplastic aromatic polyimides [type (a)] are actually only soluble in a few selected polar solvents, such as chlorinated hydrocarbons, N,N-dimethylacetamide and meta-cresol. This solubility allows them to be processed in solution into films and coatings, but it also limits the environments in which they can be utilized. The ease with which they can be thermally processed generally depends on their relative glass transition temperatures. The thermoplastic but non-soluble aromatic polyimides [type (b)] also have lower glass transition temperatures than type (c) and may be thermally processed. They may also he processed in their soluble polyamic acid precursor form. The non-thermoplastic, non-soluble aromatic polyimides [type (c)] generally must be processed in their soluble polyamic acid precursor form. The glass transitions of the type (c) polyimides are on the order of those of the aromatic polybenzimidazole available from Celanese, i.e., over 400° C.

Preferred aromatic polyimides which may be used and blended in solution to form the compositions of this invention are those which are soluble and thermoplastic [type (a)]. Some examples of these have the following repeat units. The listed commercially available variants are the most preferred.

Ciba-Geigy XU-218
Tg = 320° C.

Upjohn 2080
Tg = 310° C.

Also preferred are thermoplastic, non-soluble aromatic polyimides [type (b)] which may be blended by thermal compounding methods or which may be blended in solution in their polyamic acid precursor form. Preferred examples of this type have the repeating units given below:

LaRCTPI
$T_S$ = 264° C.

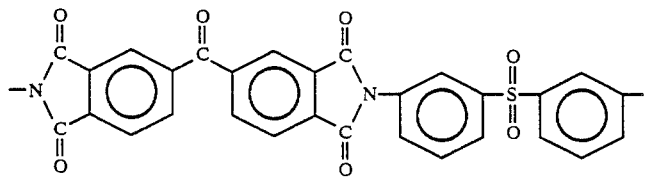

PISO
$T_S = 273°$ C.

The non-thermoplastic and non-soluble aromatic polyimides [type (c)] are generally not preferred embodiments of this invention because their glass transition are similar in value to polybenzimidazoles, but they may impart desirable properties such as solvent resistance to the aromatic polybenzimidazoles.

Although any aromatic polybenzimidazole described in the prior art may be used, the preferred aromatic polybenzimidazoles employed as starting materials to prepare the novel compositions of the present invention are those having the repeating unit formula:

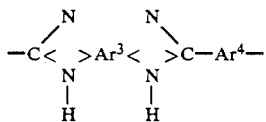

wherein $>Ar^3<$ represents a tetravalent aromatic moiety having the formula

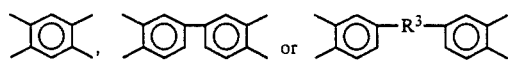

wherein $R^3$ is —O—, —SO$_2$—, or $(CH_2)_x$ and x is a positive integer; and —Ar$^4$— represents a divalent aromatic moiety having the formula

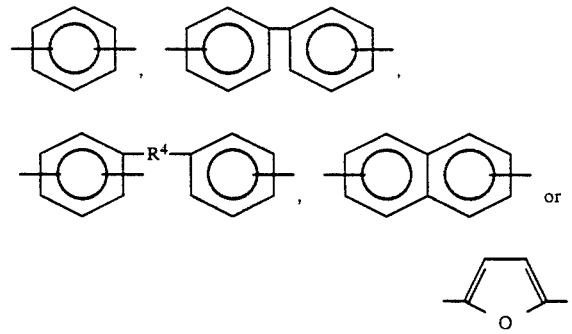

wherein $R^4$ is —O—, $(CH_2)_x$, or —Si(CH$_3$)$_2$—and x is a positive value.

Examples of the more preferred aromatic polybenzimidazoles which may be used in the compositions of the present invention include:
poly-2,2'-(m-phenylene)-5,5'-bibenzimidazole;
poly-2,2'-(pyridylene-3",5")-5,5'-bibenzimidazole
poly-2,2'-(furylene-2",5")5,5'-bibenzimidazole;
poly-2,2'-(naphthalene-1", 6")-5,5'-bibenzimidazole
poly-2,2'-(biphenylene-4", 4")-5,5'-bibenzimidazole
poly-2,6'-(m-phenylene)-diimidazobenzene;
poly-2,2'-(m-phenylene)-5,5'-di(benzimidazole)ether;
poly-2,2'-(m-phenylene)-5,5'-(benzimidazole)sulfide;
poly-2,2'-(m-phenylene)-5,5'-(benzimidazole)sulfone,
poly-2,2'-(m-phenylene)-5,5'-(benzimidazole)-methane;
poly-2,2'-(m-phenylene)-5,5"-(benzimidazole)-propane-2,2; and
poly-2,2'-(m-phenylene)-5,5"di(benzimidazole)-ethylene-1,2 where the double bonds of the ethylene groups are intact in the final polymer.

Poly-2,2'-(m-phenylene)-5,5'-bibenzimidazole, which contains recurring units of the formula:

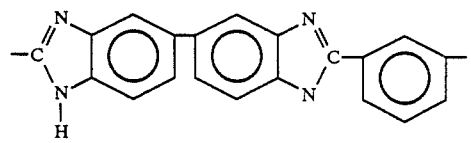

is most preferred. Aromatic polybenzimidazoles of this type are commercially available from Celanese Corporation. These polybenzimidazoles are preferred components of the compositions because they are relatively more thermally stable and more soluble in N,N-dimethylacetamide than other polybenzimidazoles. This desirable combination of thermal stability and solubility makes them relatively processable. In addition, they have higher molecular weights than other polybenzimidazoles.

The novel compositions comprise from about 1 part by weight to about 99 parts by weight of an aromatic polyimide and from about 99 parts by weight to about 1 part by weight of an aromatic polybenzimidazole. Preferably, the compositions are comprised of from about 5 parts by weight to about 95 parts by weight of an aromatic polyimide and from about 95 parts by weight to about 5 parts by weight of an aromatic polybenzimidazole. The more preferred compositions are those which are comprised mostly of either the aromatic polybenzimidazole or a soluble thermoplastic aromatic polyimide.

If a composition of the invention is mostly comprised of aromatic polybenzimidazole, it is preferred that the minor amount of a thermoplastic aromatic polyimide in the composition be sufficient to make the aromatic polybenzimidazole more thermally processable and also less susceptible to moisture. It is thought that the minor amount of the polyimide accomplishes the amelioration of the processability of the aromatic polybenzimidazole by plasticizing the polybenzimidazole. More preferably, the compositions are comprised of from about 65 parts by weight to about 95 parts by weight of an aromatic polybenzimidazole and from about 35 parts by weight to about 5 parts by weight of a thermoplastic aromatic polyimide. Most preferably, the composition comprises at least about 10 parts by weight of the thermoplastic aromatic polyimide. It is surprising that a minor amount of the polyimide can ameliorate the weak properties of the polybenzimidazole, i.e., poor thermoplasticity and moisture sensitivity, while resulting in a composition with a glass transition temperature not substantially below the glass transition temperature of the polybenzimidazole itself.

If a composition of the invention is mostly comprised of a soluble thermoplastic aromatic polyimide, it is preferred that the minor amount of aromatic polybenzimidazole in the composition be sufficient to render the soluble thermoplastic aromatic polyimide less sensitive to solvents, e.g., chlorinated hydrocarbons. Preferably, the aromatic polybenzimidazole is present in an amount sufficient to result in a composition with greatly reduced solubility and low swelling i.e., minimal weight loss in a solvent which would ordinarily result in dissolving the soluble thermoplastic aromatic polyimide itself. More preferably, the compositions are comprised of from about 65 parts by weight to about 95 parts by weight of a soluble thermoplastic aromatic polyimide and from about 35 parts by weight to about 5 parts by weight of an aromatic polybenzimidazole. Most preferably, based on preliminary tests, the composition should contain at least about 25 to 30 parts by weight of a polybenzimidazole in order to impart to the soluble thermoplastic aromatic polyimide component greatly enhanced solvent resistance. In addition to improving solvent resistance, greater amounts of aromatic polybenzimidazole in the composition substantially increase the glass transition temperature of the composition, giving improved performance. Soluble thermoplastic aromatic polyimides are commercially successful because of their ease of processing and their generally good combination of properties, with the exception, of course, of their poorer solvent resistance, e.g., to chlorinated hydrocarbons. Those properties can be substantially improved in accordance with this invention by incorporating a minor amount of aromatic polybenzimidazole in a miscible blend with the soluble, thermoplastic aromatic polyimide. It appears that all the beneficial properties of the soluble thermoplastic aromatic polyimides may be retained and solvent resistance and glass transition temperature improved for applications requiring highperformance polymers, particularly the aerospace industry. It is surprising that a minor amount of the polybenzimidazole can ameliorate the weak properties of the soluble thermoplastic aromatic polyimides, i.e., poor resistance to solvents, without decreasing the processability of the polyimide itself.

In order to prepare miscible compositions of the invention from soluble thermoplastic aromatic polyimides and, e.g., Celanese aromatic polybenzimidazole, at different weight compositions, the aromatic polybenzimidazole and a soluble thermoplastic aromatic polyimide may be first dissolved in a mutual solvent, e.g., N,N-dimethylformamide, N,N-dimethylacetamide or N-methylpyrrolidone, so that each polymer is present in the resulting solution at the desired concentrations of from about 1% to about 30% each on a weight/volume basis, preferably from about 1% to 15% each. It is preferred that the total concentration of the two polymers in the solution be such that the viscosity of the solution is acceptable for subsequent processing. The two polymers may be simultaneously dissolved in the solvent; or each polymer may be separately dissolved in separate volumes of solvent, and desired portions of the resulting solutions can be mixed together to form a solution of the two polymers.

At low concentrations of polybenzimidazoles, it is not necessary to add lithium chloride to the solution. However, at higher concentrations, it may be desirable to add lithium chloride to improve the stability of the polybenzimidazole in the solution, as it might otherwise separate from the solution. It is preferable to avoid adding anything other than the constituent polymers to the solution in order to avoid the problem of removing it from the composition after the solvent is removed.

Then the solution may be added to a non-solvent for the composition, e.g., methanol, to precipitate a novel composition of this invention with the desired ratio of component polymers. Subsequently, the precipitated composition is washed with, e.g., methanol or water, to remove residual solvent and lithium chloride if it is present and then, e.g., vacuum-dried at moderate temperatures. Alternatively, films of the solution of the composition can be cast and the solvent evaporated. Trace amounts of solvent and any lithium chloride may be removed by washing the film with hot water.

The polyamic acid process for preparing miscible compositions broadly comprises dissolving an aromatic polybenzimidazole and an aromatic polyimide in its precursor polyamic acid form in a mutual solvent in relative weight proportions to each other of from about 1 to about 99 of the aromatic polybenzimidazole to about 99 to about 1 of the polyamic acid, casting a film, removing the solvent, and then cyclizing to form the polyimide.

The generally accepted criteria for blend miscibility is a single glass transition which is intermediate to the glass transitions of the blend components. As a first approximation, the intermediate glass transition of the miscible blend will be close to that predicted by a linear interpolation between the glass transitions of the blend components. Non-miscible physical mixtures or phase separated blends will display two glass transitions, one corresponding to the composition of each phase. In the case of complete phase separation or total incompatibility, the two transitions will correspond to those of the blend or mixture components.

FIG. 1 shows the single intermediate glass transitions determined from differential scanning calorimetry scans for Celanese polybenzimidazole-Ciba-Geigy XU-218 aromatic polyimide compositions ranging from 10% to 50% of XU-218 aromatic polyimide. Also, polybenzimidazole-XU-218 aromatic polyimide films ranging in composition from 10 to 90% XU-218 aromatic polyimide were prepared and found to be transparent and flexible, indicating complete miscibility. Thus, polybenzimidazole and XU-218 aromatic polyimide are apparently miscible in all proportions.

The data in Table 1, for a DSC study of a 50/50 blend of aromatic polybenzimidazole and aromatic XU-218 aromatic polyimide, shows a single intermediate glass transition of 380° C. obtained during the first scan, indicative of blend miscibility. As the blend is thermally conditioned according to the schedule given in Table 1, the glass transition increases slowly up to 385° C. with a 410° C. conditioning temperature. It increases more rapidly at conditioning temperatures of 420° C. and higher, indicating the onset of thermally induced crosslinking, until two glass transitions are observed at a conditioning temperature of 450° C. Thus, the phase boundary for this composition occurs between 440° and 450° C.

Although the compositions of the invention are miscible in all proportions and are useful as such, useful phase-separated systems may be formed by heating the compositions above their binodal or spinodal phase boundary temperature and then rapidly quench-cooling them below their glass transition temperature to freeze the phase-separated morphology in place. The composition and properties of phase-separated systems can be controlled and varied according to the specific properties required, using pressure, temperature, time at the phase-separation conditions, and initial composition as variables. Obviously, innumerable combinations of these parameters can be employed to produce a wide assortment of potentially useful phase-separated systems.

Phase-separated systems have property synergisms when used at a temperature above the glass transition temperature of the thermoplastic aromatic polyimide component of the composition. It is possible to obtain phase-separated compositions where the matrix polymer is either the aromatic polybenzimidazole or the thermoplastic aromatic polyimide and the dispersed phase is the other polymer. This depends on which polymer is the preponderant component and the technique employed to cause the phase separation. If the aromatic polybenzimidazole is the matrix polymer of the phase-separated composition, the thermoplastic aromatic polyimide is the dispersed phase and the composition is used above the glass transition of the thermoplastic aromatic polyimide, then the composition is an impact-resistant plastic. If, however, the thermoplastic aromatic polyimide is the matrix polymer of the phase-separated composition, the aromatic polybenzimidazole is the dispersed phase and the composition is used above the glass transition of the thermoplastic aromatic polyimide, then the composition is a reinforced rubber.

A number of uses are possible for the novel compositions of this invention. For example, they are potentially useful as films, coatings and thermoplastic molding compositions.

Novel compositions according to the present invention may also possess further utility in that they may undergo crosslinking if heated at a suitable temperature, thereby improving certain properties of the constituent polymers such as softening point and resistance to solvents under stress. Such a crosslinking technique could be applied to produce resins useful in fabricating articles which have excellent mechanical and electrical properties coupled with outstanding thermal characteristics and are particularly advantageous when used as insulation for electrical conductors because they exhibit high resistance to attack by solvents and to heat stress embrittlement.

The following examples describe the manner and process of making and using the invention and set forth the best mode contemplated by the inventors for carrying out the invention, but are not to be construed as limiting.

The invention is additionally illustrated in the following examples wherein the preferred aromatic polybenzimidazole polymer is used, namely, poly-2,2'-(m-phenylene)-5,5'-bibenzimidazole, and the preferred soluble aromatic polyimides are used, namely, Ciba-Geigy XU-218 and Upjohn [Dow] 2080 aromatic polyimides.

EXAMPLE 1

Two soluble thermoplastic aromatic polyimides, Ciba-Geigy XU-218 and Upjohn 2080, were obtained and blended in different compositions with the polybenzimidazole as described below.

Blends

The blends of aromatic polybenzimidazole and soluble thermoplastic aromatic polyimides were prepared by first dissolving the aromatic polybenzimidazole and soluble thermoplastic aromatic polyimide in N,N-dimethylacetamide so that each polymer was present in the resulting solution at the desired concentrations, e.g., 1% each on a weight/volume basis and then adding the solution to methanol to precipitate a novel composition of this invention in the desired concentration, e.g., a 50/50 blend.

Glass transition temperatures and annealing data for the XU-218 polyimide/polybenzimidazole blends are shown in Table 1. The first DSC scan (no aging1 shows a single intermediate glass transition of 380° C., indicating miscibility. As the sample is aged, according to the schedule shown, the glass transition increases slightly up to 385° C. at an aging temperature of 410° C. The glass transition increases more rapidly as the aging temperature increases beyond 410° C., indicating the onset of crosslinking. At an aging temperature of 450° C., two glass transitions are observed, each approaching the glass transition of the components, thereby indicating the onset of phase separation.

TABLE 1

| Sample | Aging Conditions | | | Tg Midpoint (°C.) | | |
|---|---|---|---|---|---|---|
| | | | | Low | Intermediate | High |
| 50/50 Blend | No | | | — | 380 | — |
| XU-218/PBI* | 380° C. | 5 | min. | — | 380 | — |
| | 390° C. | 10 | min. | — | 384 | — |
| | 400° C. | 5 | min. | — | 386 | — |
| | 400° C. | 60 | min. | — | 392 | — |
| | 410° C. | 5 | min | — | 385 | — |
| | 420° C. | 5 | min. | — | 395 | — |
| | 440° C. | 5 | min. | — | 404 | — |
| | 450° C. | 5 | min. | (336) | — | (403,418) |
| | 450° C. | 30 | min. | (310) | — | (410) |
| | 460° C. | 5 | min. | | — | |
| | 470° C. | 5 | min. | | — | |

*Prepared 1% of each polymer in N,N-Dimethylacetamide and precipitated in methanol. DSC Conditions: 25° C./min, under nitrogen.

Shown in Table 2 are the results of a study for a 50/50 blend of Upjohn 2080 polyimide and polybenzimidazole. The first scan, taken after aging at 325° C. for 5 mins. shows a single intermediate glass transition, indicating miscibility. Upon aging, according to the schedule shown, the glass transition increases steadily in value with thermal aging, indicating the steady progression of crosslinking. A single strong intermediate glass transition is found up to 388° C. at an aging temperature 425° C. After an additional aging at 450° C. the magnitude of transition becomes small in magnitude, indicating a high level crosslinking. No evidence of phase separation is observed.

TABLE 2

| Sample | Aging Conditions | Tg Midpoint (°C.) Intermediate |
|---|---|---|
| 50/50 Blend | 325° C., 5 min. | 346 |
| PBI/2080* | 350° C., 5 min. | 357 |
| | 375° C., 5 min. | 366 |
| | 400° C., 5 min. | 384 |
| | 425° C., 5 min. | 388 |
| | 450° C., 5 min. | 405** |

*Prepared 1% of each polymer in N,N-Dimethylacetamide and precipitated in methanol.
**Indicating a very small T$_g$ transition DSC conditions: 25° C./min. under nitrogen.

EXAMPLE 2

Films of blends of PBI with XU-218 aromatic polyimide were prepared with 10, 25 and 50% XU-218, by casting from solutions in N,N-dimethylacetamide. The films were cast by hand, washed and dried. The DSC scans shown in FIG. 1 approximately follow the rule of mixtures indicating blend miscibility. Films were also prepared from blends which contained 10 to 90% XU-218. These were clear and flexible. Thus, aromatic polybenzimidazole and XU-218 aromatic polyimide appear to be miscible in all proportions.

Figure 2:
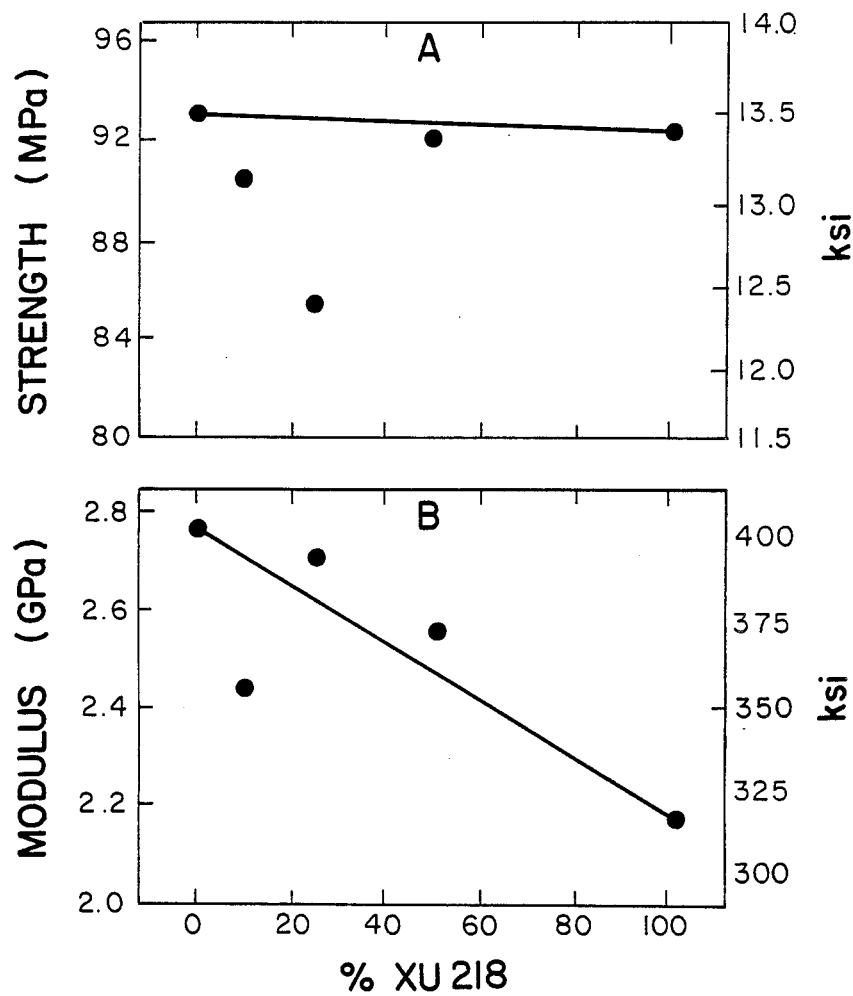
FIG. 2 shows the mechanical properties data (strength and modulus), displaying rule of mixtures behavior for the blends, which also indicates blend miscibility.

The mechanical properties data shown in FIG. 2 also display rule of mixtures behavior for the blends, which again indicates blend miscibility. (Mpa=MegaPascal, GPa=GigaPascal, and ksi=thousand pounds/square inch.) The 50/50 blend film was unaffected by methylene chloride even after immersion for several weeks.

EXAMPLE 3

Figure 3:
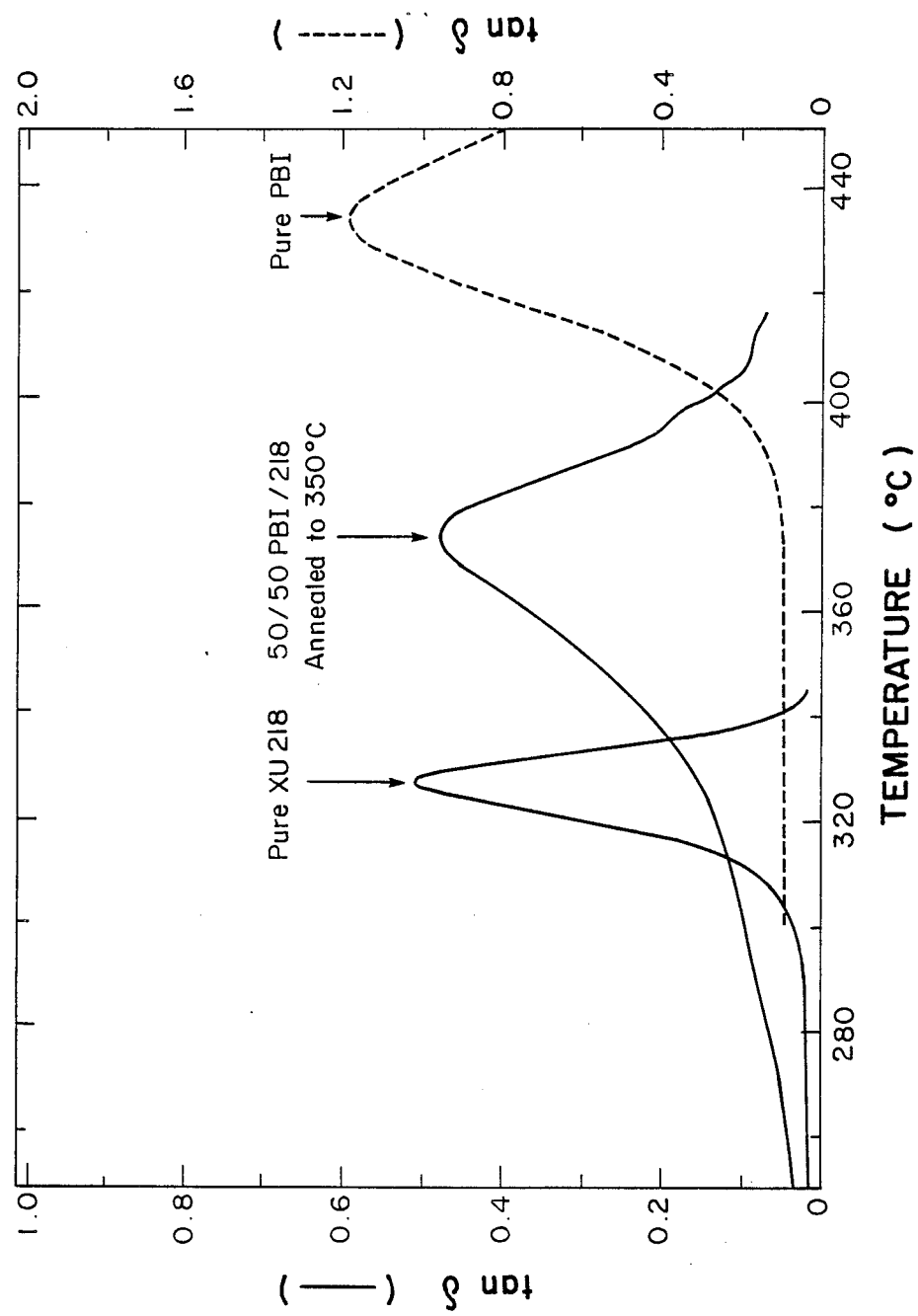
FIG. 3 shows the tan δ spectra for XU-218 aromatic polyimide, Celanese PBI and a 50/50 blend of the two polymers that had been heated to 350° C., cooled and then scanned.
Figure 4:
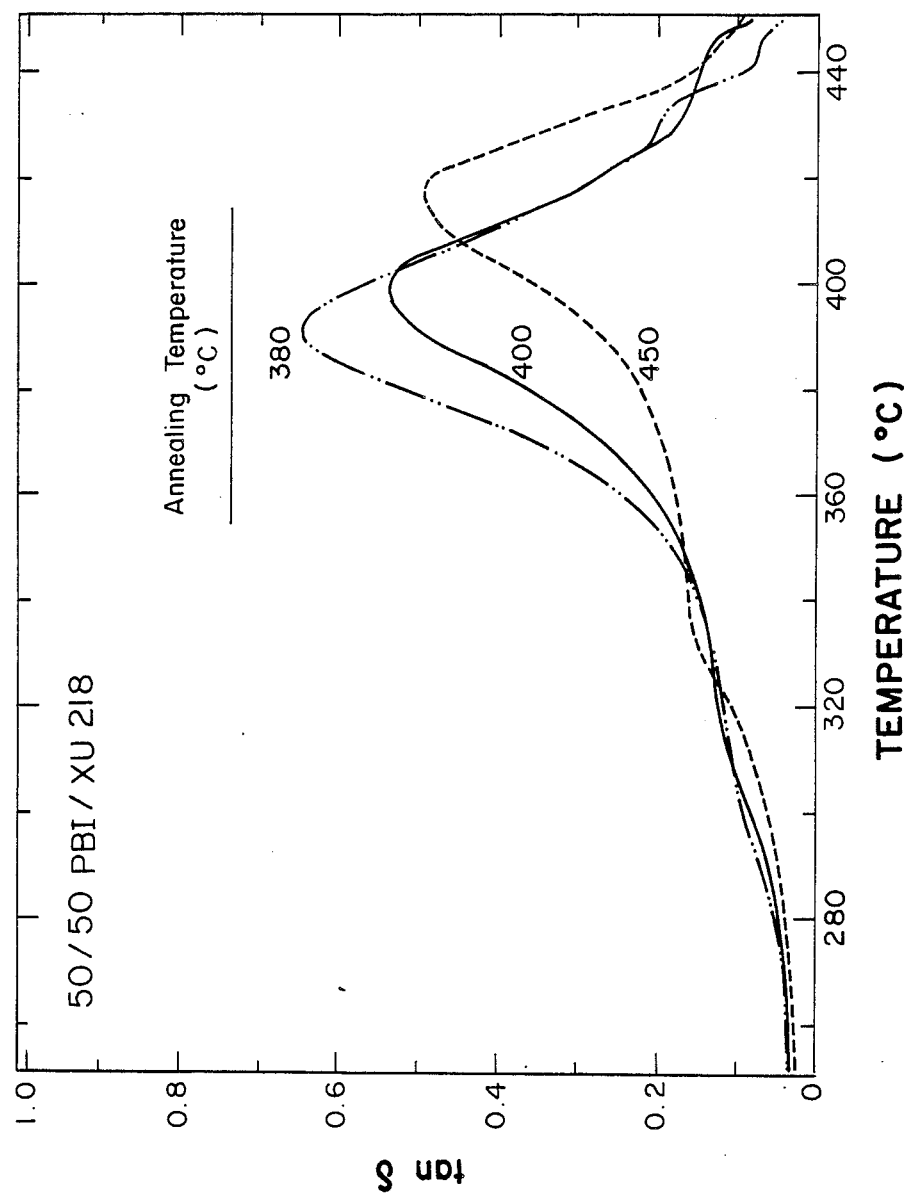
FIG. 4 shows the tan δ spectra of films that were first thermally aged by heating in the Dynamic Mechanical Thermal Analyzer at 4° C./minute to 380°, 400°, and 450° C. and then cooled to 50° C.

The dynamic mechanical properties of a film comprised of a blend of PBI and XU-218 aromatic polyimide in 50/50 proportions were assessed using a Polymer Laboratories Dynamic Mechanical Thermal Analyzer (DMTA) equipped with a 500° C. testing chamber. The scans were made at 1 Hz with a heating rate of 4° C./min under nitrogen. Shown in FIG. 3 are the tan δ spectra for XU-218 aromatic polyimide and PBI along with the 50/50 blend that had been heated to 350° cooled and then scanned. The unimodal tan δ spectrum observed for the blend is characteristic of a miscible blend Generally, the temperature at the peak of the tan δ curve corresponds to that of the glass transition determined by DSC, as spectra of films that were first thermally aged by heating in the DMTA at 4° C./min to 380°, 400° and 450° C. and then cooled to 50° C. The peak tan δ values decrease and the temperature at the peak increases with higher aging temperatures, indicating progressive crosslinking. A shoulder can be seen developing in the peak in each spectra in the temperature range of 300° to 350° C., indicating progressive phase separation.

What is claimed is:

1. A composition comprising from about 1 part by weight to about 99 parts by weight of an aromatic polyimide and from about 99 parts by weight to about 1 part by weight of an aromatic polybenzimidazole.

2. A composition as claimed in claim 1 in which the aromatic polyimide contains units of the formula:

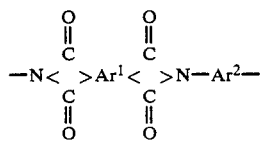

wherein >Ar$^1$< represents a tetravalent aromatic moiety having the structure:

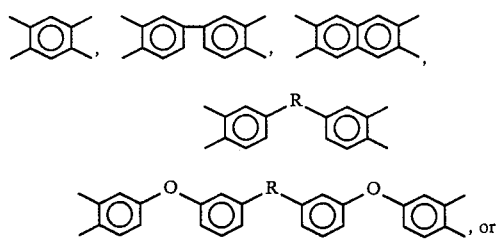

and wherein —Ar$^2$— represents a divalent aromatic moiety having the structure:

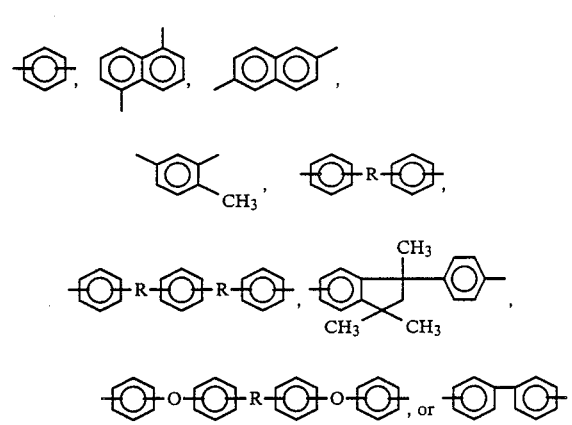

wherein R is —O—, —S—, ⁻(CH2)x⁻, ⁻(CF2)x⁻, ⁻[SiOR$^1$2]x⁻,

>C=O, >SO$_2$, >C(CH$_3$)$_2$, >C(CF$_3$)$_2$, >C(CF$_3$)(C$_6$H$_5$), >C-OH (with H), or mixtures thereof, and wherein R$^1$ is —CH$_3$, —C$_6$H$_5$, —C$_6$H$_4$—CH$_3$ or a mixture thereof, x having a value of from 1 to about 6; and the aromatic polybenzimidazole contains units of the formula:

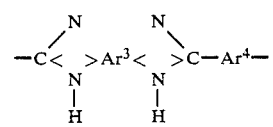

wherein >Ar$^3$< represents a tetravalent aromatic moiety having the formula

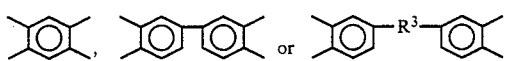

wherein R$^3$ is —O—, —SO$_2$—, or ⁻(CH2)x⁻ and x is a positive integer; and —Ar$^4$— represents a divalent aromatic moiety having the formula

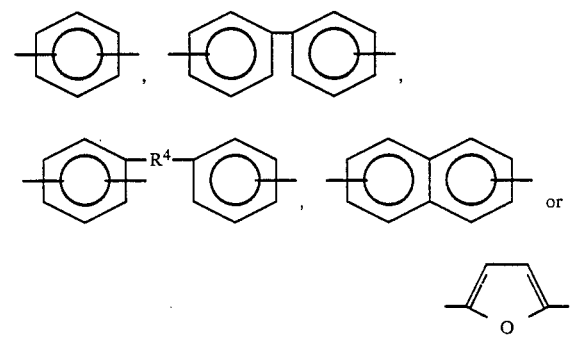

wherein R⁴ is —O—, ʕCH2ʔ, or —Si(CH₃)₂— and x is a positive value.

3. A composition as claimed in claim 1 which comprises from about 5 parts by weight to about 95 parts by weight of an aromatic polyimide and from about 95 parts by weight to about 5 parts by weight of an aromatic polybenzimidazole.

4. A composition as claimed in claim 1 wherein the aromatic polyimide is a thermoplastic aromatic polyimide.

5. A composition as claimed in claim 1 wherein the aromatic polyimide is a soluble thermoplastic aromatic polyimide.

6. A composition as claimed in claim 1 in which the composition is mostly comprised of an aromatic polybenzimidazole, and a thermoplastic aromatic polyimide is present in the composition in an amount sufficient to make the aromatic polybenzimidazole more tractable and thermally processable and also less susceptible to moisture.

7. A composition as claimed in claim 1 which comprises from about 65 parts by weight to about 95 parts by weight of an aromatic polybenzimidazole and from about 35 parts by weight to about 5 parts by weight of a thermoplastic aromatic polyimide.

8. A composition as claimed in claim 1 which comprises at least about 10 parts by weight of an thermoplastic aromatic polyimide.

9. A composition as claimed in claim 1 in which the composition is mostly comprised of a thermoplastic aromatic polyimide and the aromatic polybenzimidazole is present in the composition in an amount sufficient to make the thermoplastic aromatic polyimide less sensitive to solvents and also to increase the glass transition temperature of the polyimide.

10. A composition as claimed in claim 1 in which the composition is mostly comprised of a soluble thermoplastic aromatic polyimide and the aromatic polybenzimidazole is present in the composition in an amount sufficient to make the soluble thermoplastic aromatic polyimide less sensitive to solvents and also to increase the glass transition temperature of the polyimide.

11. A composition as claimed in claim 1 which comprises from about 65 parts by weight to about 95 parts by weight of a soluble thermoplastic aromatic polyimide and from about 35 parts by weight to about 5 parts by weight of an aromatic polybenzimidazole.

12. A composition as claimed in claim 1 which comprises at least about 25 to 30 parts by weight of an aromatic polybenzimidazole.

13. A composition as claimed in claim 1 in which the aromatic polyimide is

14. A composition as claimed in claim 1 in which the aromatic polybenzimidazole is poly-2,2'-(m-phenylene)-5,5'-bibenzimidazole.

15. A composition as claimed in claim 1 which is phase separated.

16. A composition as claimed in claim 1 which is phase separated and comprises from about 5 parts by weight to about 95 parts by weight of an aromatic polyimide and from about 95 parts by weight to about 5 parts by weight of an aromatic polybenzimidazole.

17. A composition as claimed in claim 1 which is phase separated and comprises at least about 25 to 30 parts by weight of an aromatic polybenzimidazole.

18. A composition as claimed in claim 1 which is phase separated and comprises at least about 10 parts by weight of an aromatic polyimide.

19. A film prepared from a miscible composition of claim 1.

20. A film as claimed in claim 1 wherein the aromatic polyimide is a thermoplastic aromatic polyimide.

21. A film as claimed in claim 19 wherein the aromatic polyimide is a soluble thermoplastic aromatic polyimide.

22. A film as claimed in claim 19, in which the aromatic polyimide contains units of the formula:

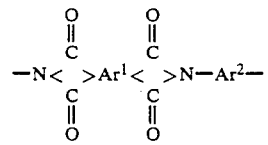

wherein >Ar¹< represents a tetravalent aromatic moiety having the structure:

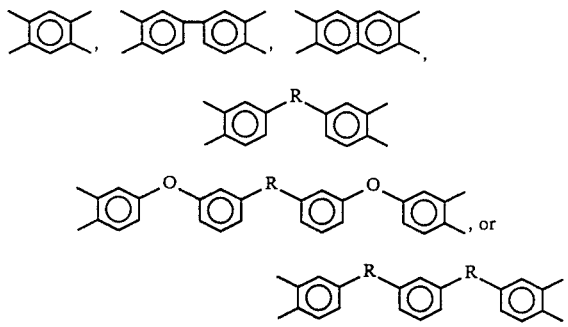

and wherein —Ar²— represents a divalent aromatic moiety having the structure:

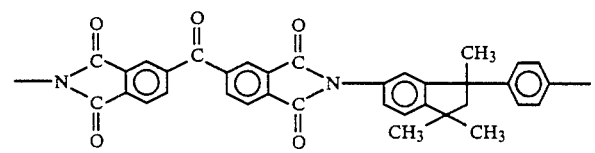

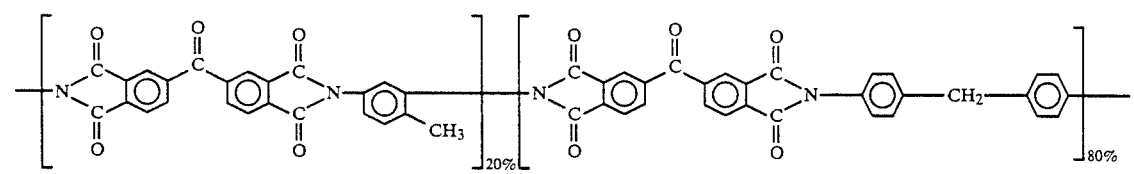

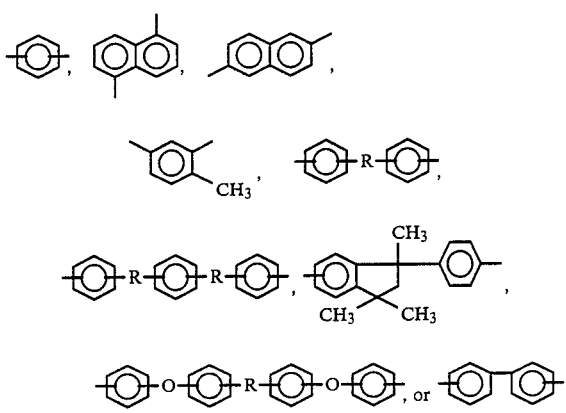

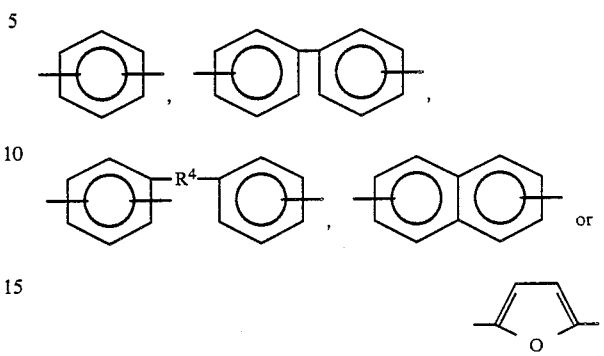

wherein R is —O—, —S—, (CH2)x, (CF2)x, [SiOR¹₂]x,

>C=O, >C—OH(H), >SO₂, >C(CH₃)₂, >C(CF₃)₂, >C(CF₃)(C₆H₅), or mixtures thereof, and wherein R¹ is —CH₃, —C₆H₅, —C₆H₄—CH₃ or a mixture thereof, x having a value of from 1 to about 6; and the aromatic polybenzimidazole contains units of the formula:

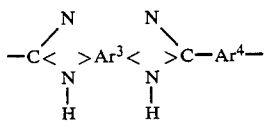

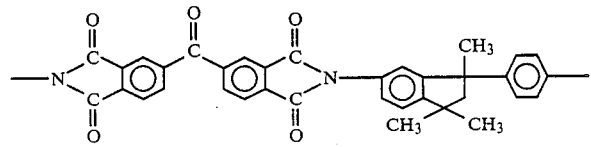

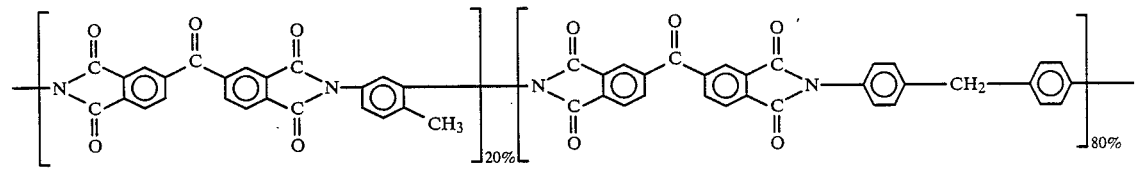

wherein >Ar³< represents a tetravalent aromatic moiety having the formula

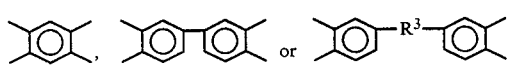

wherein R³ is —O—, —SO₂—, or (CH2)x and x is a positive integer; and —Ar⁴— represents a divalent aromatic moiety having the formula wherein R⁴ is —O—, (CH2)x, or —Si(CH₃)₂—O—Si(CH₃)₂— and x is a positive value.

23. A film as claimed in claim 19, in which the proportions are from about 5 parts by weight to about 95 parts by weight of an aromatic polyimide and from about 95 parts by weight to about 5 parts by weight of an aromatic polybenzimidazole.

24. A film as claimed in claim 19, in which there is present at least about 25 to 30 parts by weight of an aromatic polybenzimidazole.

25. A film as claimed in claim 19, in which there is present at least about 10 parts by weight of a thermoplastic aromatic polyimide.

26. A film as claimed in claim 19, in which the aromatic polyimide is

27. A film as claimed in claim 19, in which the aromatic polybenzimidazole is poly-2,2'-(m-phenylene)-5,5'-bibenzimidazole.

28. A film as claimed in claim 19 wherein the aromatic polyimide is a thermoplastic aromatic polyimide.

29. A film as claimed in claim 19 wherein the aromatic polyimide is a soluble thermoplastic aromatic polyimide.

* * * * *